Figure 1:
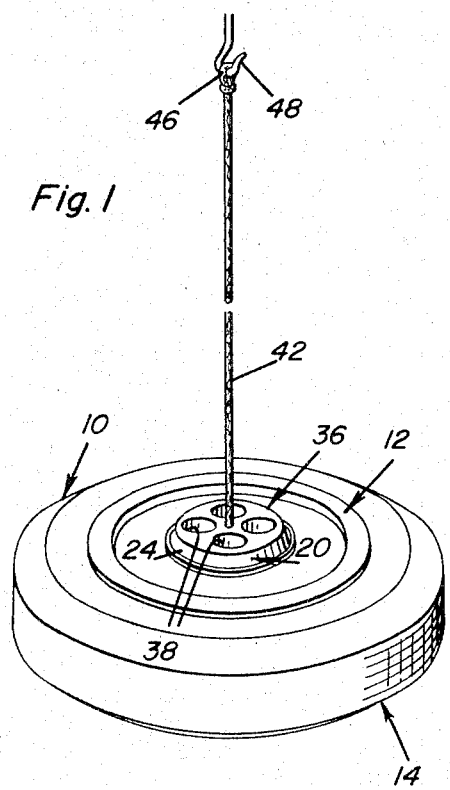

Jan. 30, 1968

A. J. LEVINO 3,365,954

WHEEL BALANCER

Filed July 23, 1965

Andre J. Levino
INVENTOR.

BY *Clarence A. O'Brien*
and *Harvey B. Jacobson*
Attorneys

United States Patent Office 3,365,954
Patented Jan. 30, 1968

3,365,954
WHEEL BALANCER
Andre J. Levino, 405 Michigan Ave.,
Jeannette, Pa. 15644
Filed July 23, 1965, Ser. No. 474,236
8 Claims. (Cl. 73—484)

This invention relates to a novel and useful wheel balancer and more specifically to an apparatus which is designed for the purpose of providing a means whereby a vehicle wheel assembly or just the rim portion thereof may be readily balanced with a minmium amount of effort.

The wheel balancer of the instant invention includes a lift member which is generally frusto-conical in configuration and which is adapted to be seatingly received in the annular central opening of a wheel rim from beneath the latter when the rim is horizontally disposed. The center portion of the frusto-conical lift member has one end of a flexible tension member secured thereto and the conical outer wall portions of the lift member are designed to properly seat the lift member within the central opening in a vehicle wheel rim in a manner such that the upstanding center axis of the lift member will be disposed exactly normal to the plane in which the central opening of an associated wheel rim is disposed.

The lift member is provided with spirit level means for indicating when the upstanding center axis of the lift member is exactly vertically disposed and therefore the spirit level may be utilized to indicate when a vehicle wheel rim supported from the lift member is out of balance and therefore has one side disposed lower than the other.

The main object of this invention is to provide a wheel balancer which may be readily used by expert as well as amateur mechanics and which will be capable of properly balancing a vehicle wheel rim or wheel rim and tire assembly.

Another object of this invention, in accordance with the immediately preceding object, is to provide a wheel balancer that does not require any outside source of energy potential such as electricity or compressed air to support proper operation of the wheel balancer.

A still further object of this invention is to provide a wheel balancer that does not require that it be either semi-permanently or permanently mounted in an operative position.

Another important object of this invention is to provide a wheel balancer which is extremely portable and light in weight whereby the wheel balancer may be readily transported from one location to another.

A final object of this invention is to provide a wheel balancer in accordance with the preceding objects which will conform to conventional forms of manufacture, be of simple construction and easy to use so as to provide a device that will be economically feasible, long lasting and relatively trouble-free in operation.

Figure 2:
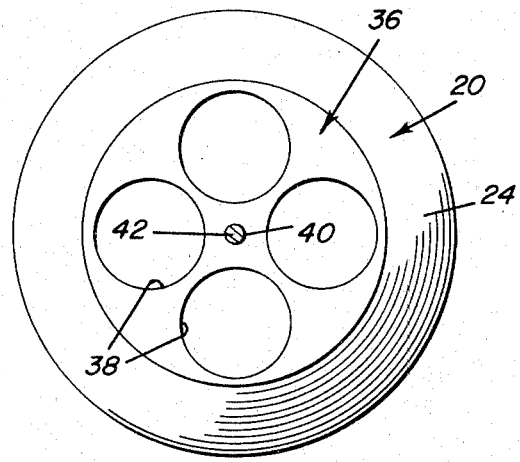
Figure 3:
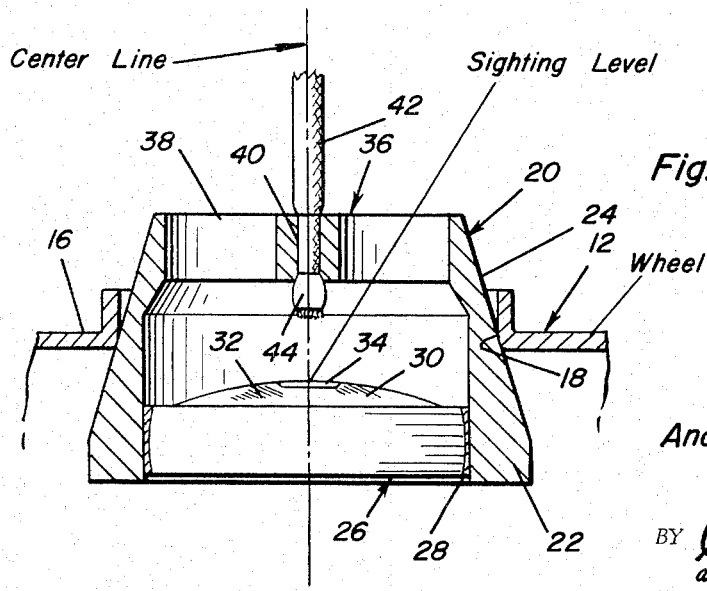

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the wheel balancer of the instant invention shown in operative position supporting a vehicle wheel assembly in an elevated position;

FIGURE 2 is an enlarged horizontal sectional view taken substantially upon a plane disposed above the generally truncated cone-shaped body of the wheel balancer and passing through the elongated flexible tension member utilized to support the body in elevated position; and FIGURE 3 is an enlarged fragmentary vertical sectional view taken substantially upon a plane passing through the center of the body of the wheel balancer.

Referring now more specifically to the drawings, the numeral 10 generally designates a vehicle wheel assembly including a rim portion generally referred to by the reference numeral 12 and a tire casing generally referred to by the reference numeral 14. The rim portion 12 includes a generally annular center web or hub portion 16 which is suitably centrally apertured as at 18.

The wheel balancer of the instant invention is generally designated by the reference numeral 20 and includes an upstanding body sleeve 22 including outer surfaces 24 which define a truncated cone. A spirit level assembly generally referred to by the reference numeral 26 is supported in the lower end of the body sleeve 22 by means of a mounting ring 28 and it may be seen that the spirit level defines a liquid reservoir including an upwardly convexed transparent upper or top wall 30. A quantity of liquid 32 is disposed in the reservoir and substantially fills the latter except for a small air pocket 34.

The upper end of the body sleeve 22 includes anchor means defined by an integral web assembly generally referred to by the reference numeral 36 and comprising a top wall for the body sleeve 22 having four circumferentially spaced large diameter openings 38 formed therein. The portion of the upper or top wall disposed between the openings 38 has a small diameter bore or opening 40 formed therethrough and the lower end of an elongated and flexible tension member 42 extends through the bore 40 and is anchored therein.

The elongated flexible tension member 42 is radially compressible and has a normal diameter greater than the diameter of the bore 40. The lower end portion of the tension member 42 is radially compressed in those portions thereof extending through the bore 40 and includes a lower terminal end portion 44 which projects below the upper or top wall 36.

The upper end of the tension member 44 includes an eye 46 which may be removably engaged with a lifting hook 48.

In operation, the body sleeve 22 may be lowered onto a generally horzional supporting surface. Thereafter, the wheel assembly 10 may be disposed over the body sleeve 22 with the central opening 18 in the hub portion 16 centered over the body portion 22. Then, the user of the wheel balancer 20 may reach through the opening 18 and grasp the free end of the tension member 42 and pull it upwardly through the opening 18 and engage it with the hook 48. Thereafter, the hook 48 may be caused to be slowly elevated in order to draw the body sleeve 22 up into engagement with the surfaces of the hub portion 16 defining the central opening 18 and to thereafter lift the wheel assembly 10 from the horizontal supporting surface.

After the wheel assembly 10 is suspended by means of the tension member 42 in the body sleeve 22, the position of the air pocket 34 may be noted and if it is disposed to one side of the center of the transparent top wall 30, suitable weights can be applied in the proper manner to the same side of the rim assembly 12 in order to properly balance the wheel assembly 10. Of course, the rim assembly 12 can be balanced without having a tire casing mounted thereon and the weights applied to the rim assembly 20 in order to properly balance the latter may be applied to both the inside and outside edge portions of the rim assembly 12 as is conventional.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel balancer for vehicle wheels having a central disc-like hub portion including means defining a circular center opening, said balancer comprising an upstanding body sleeve including outer surfaces which define cone-shaped guide means adapted to center said body sleeve in said opening upon being advanced upwardly into said opening from beneath said hub portion, a spirit level assembly secured within said body sleeve and including a closed fluid reservoir having an upwardly convexed transparent upper wall defining a segment of a sphere with the center of curvature of said upper wall coinciding with the longitudinal center axis of said body sleeve, said reservoir being substantially filled with fluid except for a small pocket of gas entrapped in said reservoir below said upper wall and centered thereunder when said sleeve is vertically disposed, and anchor support means carried by an upper portion of said body sleeve including anchor means disposed on said axis and defining sight opening means through which a person may view the center of said upper wall, and elongated flexible tension means having one end attached to said body sleeve by said anchor means.

2. The combination of claim 1 wherein said anchor means defines a bore formed through said anchor support means whose longitudinal center axis coincides with the center axis of said body, said one end of said flexible tension member being secured in said bore.

3. The combination of claim 2 wherein said one end of said flexible tension member is radially compressible and normally larger in diameter than said bore, said one end of said flexible tension member being radially compressed and frictionally retained in said bore.

4. The combination of claim 3 wherein said one end of said tension member projects downwardly through said bore and includes a lower terminal end portion beneath the lower end of said bore and of said normal diameter in size.

5. The combination of claim 1 wherein said anchor means defines a web portion extending across the upper end of said body, said web portion having a vertical bore formed therethrough whose longitudinal center axis coincides with the center axis of said body, said one end of said flexible tension member being secured in said bore.

6. The combination of claim 5 wherein said sight opening means comprises opening means in said web portion spaced radially outwardly of said bore relative to the center of said bore.

7. The combination of claim 1 wherein said anchor means defines a web portion extending across the upper end of said body, said web portion having a vertical bore formed therethrough whose longitudinal center axis coincides with the center axis of said body, said one end of said flexible tension member being secured in said bore, said one end of said flexible tension member being radially compressible and normally larger in diameter than said bore, said one end of said flexible tension member being radially compressed and frictionally retained in said bore.

8. The combination of claim 7 wherein said one end of said tension member projects downwardly through said bore and includes a lower terminal end portion beneath the lower end of said bore and of said normal diameter in size.

References Cited

UNITED STATES PATENTS

| | | | |
|---|---|---|---|
| 2,512,231 | 6/1950 | Hart | 73—486 |
| 2,720,110 | 10/1955 | Lucht | 73—484 |
| 2,919,582 | 1/1960 | Riedel | 73—484 |
| 3,036,468 | 5/1962 | Anderson | 73—486 |

RICHARD C. QUEISSER, *Primary Examiner.*

J. GILL, *Assistant Examiner.*